P. BURRILL.
AXLE LUBRICATOR.
APPLICATION FILED MAY 28, 1913.
1,155,790.
Patented Oct. 5, 1915.
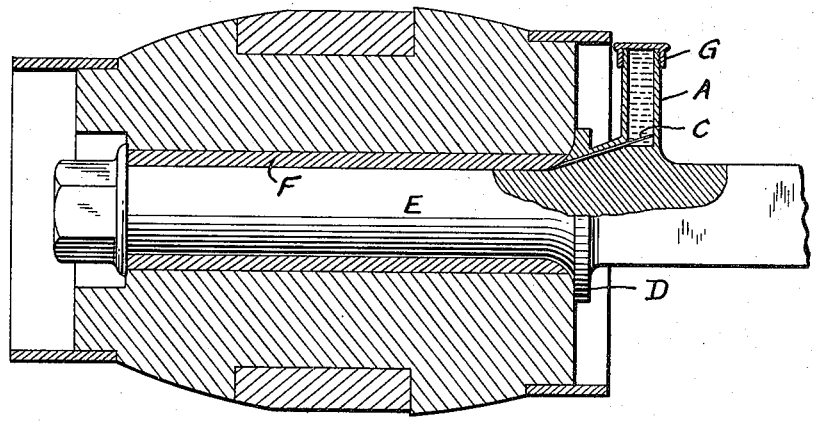
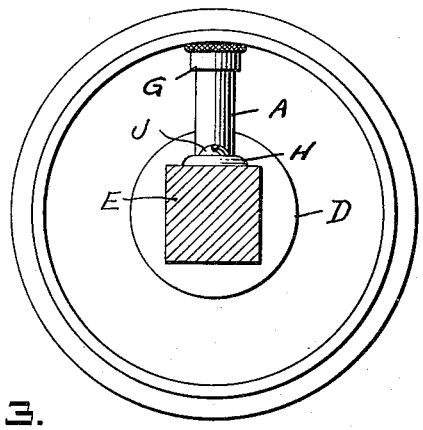
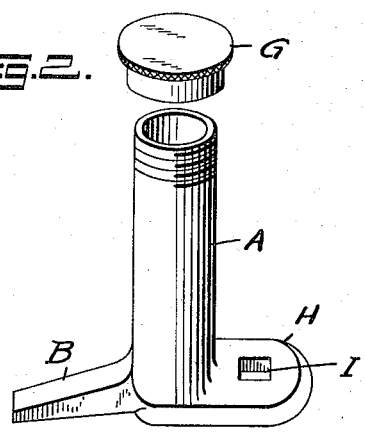
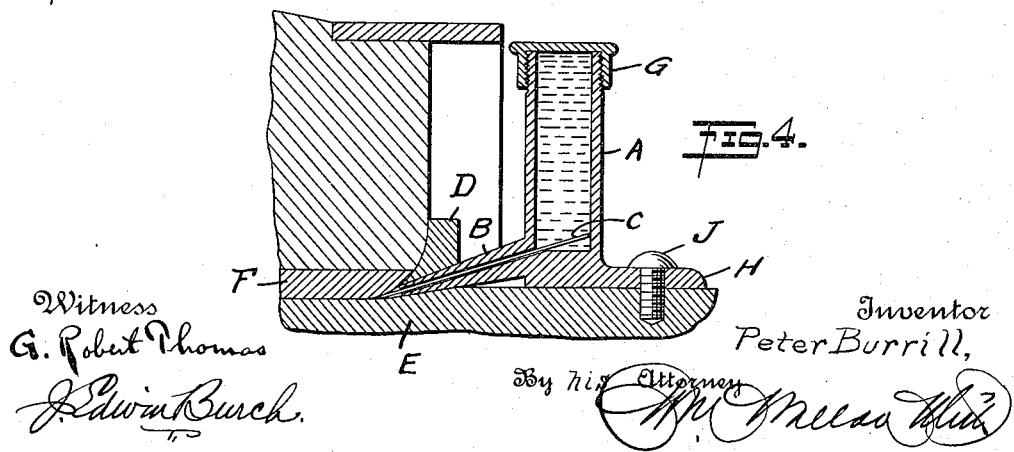
Witness
G. Robert Thomas
J. Edwin Burch
Inventor
Peter Burrill,
By his Attorney

UNITED STATES PATENT OFFICE.

PETER BURRILL, OF BALMAIN, NEAR SYDNEY, NEW SOUTH WALES, AUSTRALIA.

AXLE-LUBRICATOR.

1,155,790.  Specification of Letters Patent.  Patented Oct. 5, 1915.

Application filed May 28, 1913. Serial No. 770,345.

*To all whom it may concern:*

Be it known that I, PETER BURRILL, a subject of the King of Great Britain, residing at No. 459 Darling street, Balmain, near Sydney, in the State of New South Wales and Commonwealth of Australia, have invented a new and useful Improved Axle-Lubricator, of which the following is a specification.

This invention has been specifically devised in order to provide a cheap and simple lubricator for the spindles of the axles of road vehicles whereby lubrication is thoroughly achieved and the frequency of removal of the wheels for that purpose considerably decreased.

This improved lubricator for road vehicle axles comprises in combination with a vehicle axle a reservoir having a bored conductor stem projecting from its base and through the axle abutting ring and being integral with the axle or having a drilled flange or foot on its lower part to enable it to be attached to said axle. But in order that a practical application of this invention may be easily carried into effect it will now be described with reference to the accompanying drawings wherein—

Figure 1 is a sectional elevation of a hub and axle, showing the lubricator in position, the lubricator being formed integral with the axle. Fig. 2 a perspective view of the lubricator parts made separate from the axle and Figs. 3 and 4 an end elevation and enlarged fragmentary sectional view respectively of the device with a lubricator as shown in Fig. 2.

The lubricant reservoir A as shown in Figs. 2, 3 and 4 of the drawings, is formed separate from the axle and has a projecting stem B through which is a very small downwardly inclined passage or hole in which is a loose needle or pin C. This stem B projects through the axle abutting ring D and terminates between the axle spindle E and wheel box F. The reservoir A preferably has a cap G and on its base there is a foot H with orifice I adapted to receive a securing screw J taking in the axle. Or as shown in Fig. 1 of the drawings, the stem B with its passage and the foot H may be constructed integral with the axle E in the forging thereof while in axles with loose collars the lubricator would be on said collar.

The angle of the lubricator stem and conducting passage might be varied according to the density of the lubricant employed though that shown is the best for ordinary preparations. The improved lubricator might be forged upon new axles during construction. In use more or less fluid is filled into the reservoir A and it is drawn through the inclined passage or hole assisted by the vibration caused by the contact of the pin C with the rotating face of box F.

What I claim as my invention and desire to secure by Letters Patent is:—

1. In a device of the character described, in combination, a vehicle axle provided with an axle abutting ring, a lubricant reservoir on the axle and projecting at substantially right angles therefrom, a downwardly inclined conduit communicating with the bottom of said reservoir and with the surface of the axle spindle and extending through said ring, and a pin loosely extending through said reservoir and said conduit and having its lower end extending beyond the other end of said conduit, whereby the pin is vibrated by the rotation of the wheel of the vehicle for feeding the lubricant to the spindle.

2. In a device of the character described, in combination, a vehicle axle, a lubricant reservoir on the axle and projecting at substantially right angles therefrom, a downwardly inclined conduit communicating with the bottom of said reservoir and with the surface of the axle spindle, a pin having one arm loosely positioned in said conduit and the other arm of said pin loosely positioned in said reservoir, the lower end extending beyond the outer end of said conduit, whereby the pin is vibrated by the rotation of the wheel of the vehicle for feeding the lubricant to the spindle.

3. In a device of the character described, in combination a vehicle axle provided with an axle abutting ring, a lubricant reservoir on the axle and projecting at substantially right angles therefrom, a downwardly inclined conduit in said axle extending substantially parallel with the spindle of the axle and communicating with the bottom of the reservoir and with the surface of said spindle, and a pin having one arm loosely positioned within said conduit and the other arm loosely positioned in said reservoir, the lower end of said pin extending beyond the outer end of said conduit and parallel with the surface of the spindle, whereby the pin is vibrated by the rotation of the wheel of the vehicle for feeding the lubricant to the spindle.

4. In a lubricator of the class described, for a stationary spindle having an element rotatably retained thereon, comprising a lubricant reservoir on the spindle and having a projecting stem tapered toward its free end and provided with an inclined feed passage therethrough communicating with the reservoir and with the surface of the axle between the latter and the rotating element and a pin fitted in said passage loosely and adapted to be vibrated by the rotation of the element for feeding the lubricant to the spindle.

5. In a lubricator of the class described, the combination with a vehicle axle; of a lubricant reservoir on the axle and projecting upwardly therefrom, a stem projecting from the reservoir and provided with a feed passage leading to the surface of the axle, said axle being provided to limit the displacement of a wheel inwardly thereon, a pin loosely mounted in the passage and gravitating toward the axle to contact with the latter and adapted to be vibrated by the rotation of the wheel for feeding the lubricant and a cap for said reservoir.

In testimony whereof I have signed my name to this specification in the presence of two subscribing witnesses.

PETER BURRILL.

Witnesses:
PERCY NEWELL,
GEORGE MANSON.

Copies of this patent may be obtained for five cents each, by addressing the "Commissioner of Patents, Washington, D. C."